US005721302A

United States Patent [19]
Wood et al.

[11] Patent Number: 5,721,302
[45] Date of Patent: *Feb. 24, 1998

[54] WATER DISPERSIBLE ADHESIVE

[76] Inventors: Benny R. Wood, 187 Tate Estates Rd., Rome, Ga. 30161-9107; Howard Burchett, Jr., 387 Sunset Dr. SE., Calhoun, Ga. 30701

[*] Notice: The term of this patent shall not extend beyond the expiration date of Pat. Nos. 5,652,288 and 5,455,293.

[21] Appl. No.: 715,129

[22] Filed: Sep. 17, 1996

Related U.S. Application Data

[63] Continuation-in-part of Ser. No. 636,735, Apr. 19, 1996, Pat. No. 5,652,288, which is a continuation-in-part of Ser. No. 423,591, Apr. 17, 1995, abandoned, which is a continuation of Ser. No. 254,317, Jun. 6, 1994, Pat. No. 5,455,293.

[51] Int. Cl.$^6$ ....................................... C08L 75/06
[52] U.S. Cl. .................... 524/271; 524/35; 524/270; 524/272; 524/274; 524/764
[58] Field of Search ........................... 524/270, 271, 524/764, 35, 272, 274

[56] References Cited

U.S. PATENT DOCUMENTS

| | | |
|---|---|---|
| 4,412,033 | 10/1983 | Labelle et al. . |
| 4,654,388 | 3/1987 | Lofgren . |
| 4,745,026 | 5/1988 | Tsukahara . |
| 4,904,522 | 2/1990 | Markusch . |
| 5,157,074 | 10/1992 | Metzger et al. . |
| 5,185,200 | 2/1993 | Tirpak et al. . |
| 5,191,012 | 3/1993 | Markusch et al. . |
| 5,212,230 | 5/1993 | Tirpak et al. . |
| 5,221,710 | 6/1993 | Markusch et al. . |
| 5,236,994 | 8/1993 | Markusch et al. . |
| 5,258,425 | 11/1993 | Kirby . |
| 5,354,807 | 10/1994 | Dochniak . |
| 5,443,674 | 8/1995 | Fresonke et al. . |
| 5,494,960 | 2/1996 | Rolando et al. . |
| 5,508,371 | 4/1996 | Werenicz et al. . |
| 5,523,344 | 6/1996 | Maksymkiw et al. . |

*Primary Examiner*—Patricia A. Short
*Attorney, Agent, or Firm*—Haugen and Nikolai, P.A.

[57] ABSTRACT

A high shear strength, solvent-free water-based adhesive composition for removably fixing flooring materials which includes a major amount of an aqueous latex dispersion of a polymer latex base material with an optional minor amount of polyether or polyester-polyurethane synthetic resin, an amount of rosin acid ester hardener, an amount of a thickener together with an amount of inert filler and an amount of a plasticizer/extender in sufficient water to adjust the percent solids to the desired amount.

12 Claims, No Drawings

WATER DISPERSIBLE ADHESIVE

This application is a continuation-in-part of application Ser. No. 08/636,735, filed Apr. 19, 1996, now U.S. Pat. No. 5,652,288, which, itself, is a continuation-in-part of a application Ser. No. 08/423,591, filed Apr. 17, 1995, now abandoned which is a continuation of application Ser. No. 08/254,317, filed Jun. 6, 1994, now U.S. Pat. No. 5,455,293, issued Oct. 3, 1995. Any material found in the above-referenced applications not specifically contained herein is further deemed incorporated by reference for any purpose.

BACKGROUND OF THE INVENTION

I. Field of the Invention

The present invention relates generally to industrial and commercial adhesives and, more particularly, to a solvent-free, water-based polymer latex adhesive which may contain an amount of water-based polyurethane latex that may be used advantageously to adhere a wide variety of types of floor covering materials to a variety of flooring surface materials. The adhesive is solvent-free and relatively water and solvent resistant and may undergo further cross-linked to provide additional environmental resistance as desired, particularly for outdoor installations.

II. Related Art

Presently, the most prevalent, conventional multi-purpose floor covering adhesive materials include a styrene-butadiene latex (SBR) or an acrylic latex material. Conventional premium grade multi-purpose floor covering adhesives using styrene-butadiene latex (SBR) generally include SBR latex, water, alkali (pH modifiers), Kaolin Clays slurry (fillers), aliphatic resins, naphthanic oil (emulsified), freeze-thaw additives, antimicrobial additives and thickeners. The aliphatic resins and naphthanic process oils require emulsifiers, normally surfactants, such as fatty acid, tall oil or laural sulfate based surfactants. These adhesives have been used for a period of time to successfully attach a variety of materials to a variety of floors.

However, conventional SBR-based multi-purpose floor covering adhesives do have drawbacks which limit their desirability. While generally described as multi-purpose, the formulas typically must be modified to accommodate each specific type installation, i.e., each distinct floor covering product to be glued. Conventional SBR adhesives exhibit very poor alkali and moisture resistance, making them unsuitable, for example, for outdoor use. These materials also do not exhibit long-term resistance to plasticizer migration when used, for example, in conjunction with polyvinyl chloride materials with dense vinyl backing. SBR latex adhesives characteristically have poor resistance to soaps, surfactants, and solvents (for example, VM&P naphtha, paint thinners, degreasers, and other cleaning liquids). Furthermore, these adhesive materials include naphthanic oils and/or aliphatic resins which must be emulsified, i.e., these materials must be modified with amounts of surfactants (e.g., fatty acids, tall oils or laural sulfate-based surfactants) to provide adequate compound stability and extended storage or shelf life.

The conventional SBR material itself, also, has definite practical installation limitations. The material requires a rather long (24–72 hours) curing time to develop maximum bond strength. In addition, the curing and set-up cycle are further dramatically affected by cure temperature, relative humidity and other environmental conditions. The volatile solvent materials are also undesirable VOC emitters.

Both water dispersible polyisocyanates (polyurethanes) and methods for obtaining stable aqueous dispersions of hydrophobic polyisocyanates through chemical modifications are known. It is also known to utilize external surfactants or additives or high shear mechanical devices to create relatively stable water dispersions of hydrophobic polyisocyanates. Markusch (U.S. Pat. No. 4,904,522), and Tirpak et al (U.S. Pat. No. 5,185,200) have disclosed the preparation and use of aqueous polyisocyanate emulsions for use as binders in the production of fiberglass mats. Aqueous compositions containing encapsulated polyisocyanate which contains unreacted isocyanate groups also are disclosed by Markusch et al in U.S. Pat. No. 5,191,012). Tirpak et all, in U.S. Pat. No. 5,212,230, create an aqueous polyurea dispersion by reacting a concentrated polyisocyanate and a polyamine in an aqueous medium. Another aqueous binder composition containing a trimerization catalyst that provides aqueous compositions which do not require water to cure and which possess good adhesion properties with regard to glass fibers are illustrated by Metzger et al (U.S. Pat. No. 5,157,074). In addition, dispersions of polyisocyanates in aqueous solutions have been used as sealants to prevent the evaporation of water and thereby to improve the cure and strength of green concrete. The material is applied as a dilute aqueous solution and such a system is shown by Markusch et al (U.S. Pat. No. 5,236,994).

Tsukahara et al in U.S. Pat. No. 4,745,026 describe a thermal delayed tack composition in which an adhesive polymer is combined with a particulate solid plasticizer and a tackifier. This material is non-tacky when applied to a surface at ordinary temperature and requires an additional heating or activation step to achieve the tackiness required for the material to operate as an adhesive. Adhesive materials such as this that require an activation step after application as by heat to achieve full adhesive properties are often referred to as two-step adhesives or the use of them as a two-step bonding process. Adhesive materials that achieve full tackiness or adhesion properties and cure as applied from the container without the need for any separate activation step are referred to as single-step adhesives. It will readily be appreciated that a second step requirement, particularly one such as heat activation, for example, presents a serious drawback where the adhesive is used over a large surface such as in the application of floor coverings.

The adhesives of the present invention are single-step or one-step adhesives which are quite tacky as applied and remain tacky indefinitely. The material will set up and cure as applied without the need for the application of heat or other additional treatments. The materials of the invention are pressure sensitive materials particularly designed to achieve high shear strength in a relatively short time so that floor coverings applied can be used soon after application without fear of displacement from the applied desired location.

The known art, however, does not suggest the use of water-dispersible polyisocyanate modified polymer latex based adhesive materials as general adhesives; in particular, the art does not suggest a solvent-free system of the class that is of particular value as floor covering adhesives.

It is an object of the present invention to provide a one-step universal, water-based adhesive formulated with a polymer latex optionally modified with a polyisocyanate (polyurethane) latex suitable to adhere many types of materials.

Another object of the invention is to provide a one-step cross-linkable universal, water-based, polymer latex floor covering adhesive suitable to adhere all types of floor covering materials and suitable for indoor or outdoor use without the drawbacks of conventional SBR-based formulas.

A further object of the invention is to provide a high shear strength universal, one-step water-based adhesive material suitable for indoor or outdoor use that allows removal and replacement of the floor covering material.

Yet another object of the invention is to provide a universal, water-based polymer/polyurethane latex floor covering adhesive which is solvent-free and has extremely low VOC emission rendering it environmentally benign for indoor as well as outdoor use.

A still further object of the present invention to provide a universal water-based polymer/polyurethane latex floor covering adhesive that can be used soon after installation.

Yet still another object of the present invention is to provide a water-based universal floor covering adhesive that is extremely resistant to most common household and industrial solvents and cleaners.

Still another object of the invention is to provide a water-based floor covering adhesive that is highly resistant to surface moisture emission or infiltration.

A yet still further object of the invention is to provide a water-based floor covering adhesive that is alkali resistant and resistant to plasticizer migration.

Other objects and advantages should become apparent to those skilled in the art upon further consideration of the description and accounts contained in this specification.

SUMMARY OF THE INVENTION

The present invention involves unique, universally applicable water-dispersible polymer latex based, polyurethane modified adhesive formulations which function especially well in removably fixing all types of floor covering materials in place but whose useful applicability extends far beyond floor coverings to a vast variety of products to be glued. This universality can be successfully accomplished with a few minor formulation modifications, such as the addition or modification of cross-linking agents. The materials have a variety of beneficial attributes making them more desirable than and superior to present products for like uses. The materials have a relatively long, stable shelf life, are solvent-free, and extremely low VOC emitters, making them environmentally advantageous, especially in closed spaces. The need for aliphatic resins and napthenic process oils and special surfactants have been eliminated.

The materials demonstrate excellent green tack and exhibit very strong early shear bonding (10–12 psi) within a few hours (1–2 hours) of application. Adequate tensile strength may be reached in as little as 6–7 hours after application. Although the materials remain tacky indefinitely, they achieve sufficient ($\cong$20 psi) lift tensile strength to be more than adequate for retention. The tacky condition allows adhered materials to be lifted off and replaced at a future time with a minimum of labor and damage. Formulations in accordance with the invention are further highly alkali resistant (up to at least a pH of 11.0) and plasticizer migration resistant.

In the case of use on porous concrete or wood floors or other permeable surfaces in which surface moisture emission or infiltration occurs, the material can be used as a primer or sealcoat in addition to being used to bond the flooring materials. When it is used as a primer or sealcoat, the material will resist surface moisture emission rates as high as 5.5–6.0 pounds per 1000 square feet per 24 hours. Thus, the material can be used to seal high-seepage floors, for example, using a two-coat process in which a first coat is applied and allowed to cure; and thereafter, a second coat is applied to bond the flooring material in a one-step bonding operation.

While the base materials are generally self-cross-linking, certain properties of the water-dispersible universal adhesive of the invention can be modified, particularly in a polyurethane fraction, using additional cross-linkers in the formula, if desired. The cross-linkers further decrease time to maximum bonding strength and greatly increase the water resistance of the final bond, which is especially desirable for outdoor use. The cured, cross-linked material further is also extremely resistant to most common household and industrial solvents and cleaners (for example, VM&P naphtha, gasoline, paint thinners, degreasers, cleaning liquids and the like) and exhibits good heat resistance (stable to 180° F., 82° C.).

The preferred formulation includes a major fraction of a water dispersible polymer latex based materials such as as acrylics, styrene-butadiene, carboxylated styrene-butadiene, nitriles, neoprenes, ethylene vinyl acetates in combination with a minor amount of water dispersible polyisocyanate latex (polyurethane latex), an amount of a resin hardening agent (rosin acid ester dispersion), an amount of polyacrylate thickening agent combined in an amount of water to give the desired percent solids. The formulas typically also include inert filler additives and plasticizer/extender modifiers. Cross-linking agents such as aliphatic polyisocyanates or poly-functional water dispersible isocyanates, aziridines and carbodiimides may be utilized in minor amounts with the polyurethane material if additional cross-linking is desired in a polyurethane fraction of a particular application. A preferred (weight) formulation range appears next below.

PREFERRED FORMULATION RANGE

| | |
|---|---|
| Polymer Latex Based Materials (such as Acrylics, Styrene-butadiene, Carboxylated Styrene-butadiene, Nitriles, Neoprenes, Ethylene Vinyl Acetates) | 50–100 parts |
| Polyester or Polyether-Polyurethane Latex Modifiers | 0–80 parts |
| Inert Filler Additives (Kaolins, Calcium Carbonates, Barium Sulfates, Silicate spheres, Ground reprocessed rubber, Cellulose, synthetic fiber (reclaimed) | 0–160 parts |
| Plasticizer/Extender Modifiers (paraffinics, naphthenics, phthalates) | 0–15 parts |
| Rosin Acid Ester | 25–70 parts |
| Polyacrylate (thickener) | 1–5 parts |
| Water (adjustment for solids) | 50–70 percent solids |
| Polyisocyanate Cross-linker (aliphatic polyisocyanate, aziridine, or carbodiimide cross-linker) | 2–10 parts |

The open time is not limited because the material remains tacky indefinitely. Relatively high shear strength is achieved quickly, i.e., in 1–3 hours.

DETAILED DESCRIPTION

The polyurethane latex modified polymer latex based adhesives of the present invention contemplate wide usage as universal water-based adhesives. While other uses, are contemplated, in the detailed description of the specification, is directed to using the material to adhere any type of floor covering material/floor combination. Optional additional cross-linking may be used to impart greater solvent resistance and environmental stability to accommodate more severe application conditions. Types of carpet materials typically include Actionback (a trademark of Patchoque-Plymouth Division of Amoco Fabrics), jute-backed; latex or urethane unitary structure; carpet tiles (polyvinyl chloride, urethane or polyurethane or polypropylene) hot-melt secondaries, e.g., Unibond (a trademark of Burlington Industries Lees Carpets), carpets with attached cushion backings or urethane or rubber polymer backings and in direct or double glued systems (pad to floor and carpet to pad) also adhere well. All types of sheet vinyl materials may be fixed including those that are mineral, paper or felt-backed; cushion vinyls (full spread or perimeter installations); pure vinyl (full spread); linoleums; and pure vinyl or vinyl composition tiles. Other floor coverings contemplated include rubber radial tiles, ceramic tiles, vinyl planks, laminated wood parquet and laminated wood plank. Installation may be indoors or outdoors or under more stressful environments.

The qualities of the formulations in accordance with the present invention are generally superior to conventional adhesives including conventional styrene-butadiene latex (SBR) and/or acrylic latex materials with respect to user friendliness in adhesion and environmental consideration and environmental stability. The water-based materials are extremely stable in storage and contain no volatile solvents or other chemical ingredients which emit undesirable vapors. The materials remain tacky as to allow any open time needed by installers. The installed material quickly reaches a high degree of shear resistance so that after about one hour the location is fixed. Tensile strength increases to about 20 psi over time, but the material never becomes hard and remains tacky or adhesive to the touch so that removal or lift-off of flooring materials adhered with the adhesives of the invention can be accomplished with a minimum of effort. Thus, an important aspect of the polyester-polyurethane modified polymer latex-based water-based system is that it is quite user friendly, both for the installation due to rapid shear strength build-up and removal/replacement aspects due to pealability.

The adhesives are tacky (sticky to the touch) as applied and are one-step bonders that require no separate activation step to fully cure or stabilize. High shear bonding time (10–12 psi) is short (1–2 hours) so that carpet can be installed "overnight" and used the next morning. Full tensile bonding occurs within 24 to 36 hours. Furthermore, in addition to exhibiting excellent bonding characteristics, the adhesives of the invention are also excellent sealant for moisture emitting surfaces.

The general formulation of the adhesive of the invention normally, but optionally, includes, in addition to a polymer latex base material, a modifier in the form of a waterborne polyether or polyester-polyurethane material in aqueous dispersion combined with an amount of rosin acid ester hardening agent in the form of an aqueous dispersion of synthetic resin, an amount of a thickening agent, typically polyacrylate, and sufficient water to yield the desired percent solids. The material includes an inert filler additive and a plasticizer/extender modifier. In addition, the formulation may include an amount of polyisocyanate, aziridines, or carbodiimide cross-linking material to cross-link any polyester or polyether/polyisocyanate resin material.

The cross-linking agent is also a water-dispersible polyisocyanate preferably in the form of an aliphatic polyisocyanate. One successfully used in the formula of the invention was based on a 1,6-Hexamethylene Diisocyanate (HDI), also known as polymeric hexamethylene diisocyanate, such products are available from the Polystar Rubber Division of Miles Inc. in Pittsburgh, Pa., identified as "Desmodur DA" or "R 255." Other cross-linkers such as aziridines and carbodiimides can also be used.

The formula also contains significant amounts of rosin acid ester hardening agents in the form of an aqueous dispersion of rosin ester, also known as a synthetic resin dispersion. In addition, the preferred adhesive formulation of the invention further contains varying amounts of inert filler additives and plasticizer/extender modifier compounds.

The suitable polymer latex base materials include acrylics, styrene-butadiene, carboxylated styrene-butadiene, nitriles, neoprenes, ethylene vinyl acetates, and the like. The preferred base material is a pressure sensitive acrylic ester-type latex amulsion. The preferred polyurethane modifier is a waterborne polyether polyurethane.

Inert filler additives are also utilized, such as calcium carbonate in the form of whiting material, one of which is known as Marble White 199 available from Filler Products, Inc., Chatsworth, Ga. That material is typically a minimum of 95% carbonates, including calcium (Ca) and magnesium (Mg), of which the magnesium carbonate is typically 20%–30%. The balance of the materials includes silica ($SiO_2$), 1–1.5% and iron and aluminum oxides ($Fe_2O_3$ and $Al_2O_3$), 1–1.5%. The material is typically fine enough to pass –325 mesh. Other inert filler additives include Kaolin (hydrated aluminum silicate or china clay). This material is also typically –325 mesh and is available as spray-dried beads or in slurry form. Other useful inert filler additives include barium sulfates, silicate spheres, ground reprocessed rubber, cellulose, synthetic fiber (reclaimed) and any other materials having the chemical compatibility and physical properties desired.

The material also typically contains some plasticizer/extender modifying material such as paraffinic, naphthenics, and phthalates. These generally affect the spreadability of the material.

According to the present invention, the following represents an approximate weight percentage composition range of the preferred combination.

| | |
|---|---|
| Polymer Latex Base Materials (such as Acrylics, Styrene-butadiene, Carboxylated Styrene-butadiene, Nitriles, Neoprenes, Ethylene Vinyl Acetates) | 50–100 parts |
| Polyester or polyether Polyurethane Latex Modifiers | 0–80 parts |
| Inert Filler Additives (Kaolins, Calcium Carbonates, Barium Sulfates, Silicate spheres, Ground reprocessed rubber, Cellulose, synthetic fiber (reclaimed) | 0–160 parts |
| Plasticizer/Extender Modifiers (paraffinics, naphthenics, phthalates) | 0–15 parts |
| Rosin Acid Ester | 25–70 parts |
| Polyacrylate (thickener) | 1–5 parts |
| Water (adjustment for solids) | 50–70 percent solids |
| Polyisocyanate Cross-linker (aliphatic polyisocyanate, aziridine or carbodiimide cross-linker) | 2–10 parts |

The relative amounts of the polymer latex base material and the polyurethane latex modifiers may vary in accordance with the desired or particular use of the adhesive to be prepared. The polymer latex base material imparts high tacky or stickiness and high shear resistance to the product whereas increased amounts of polyurethane latex modifiers can be used to increase the tensile of the system as desired.

For water resistance, approximately 7% aliphatic polyisocyanate (1,6-hexamethylene diisocyanate based polyisocyanate) cross-linking agent or a poly-functional water dispersible isocyanate may be added for modified curing properties and to provide additional water and solvent resistance.

The thickener material adds body and spreadability to the material and is typically an acrylic polymer in the form of a polyacrylate copolymer, ammonium salt, such as "Alcogum Arm" available from Alco Chemical Division of National Starch and Chemical Company, Chattanooga, Tenn.

The polyester or polyether-polyisocyanate (polyurethane) aqueous dispersion is of a class of dispersible materials available in liquid form. This is the principal modifier material for the base material.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Variations of the composition within the parameters of the General Formula adjust physical properties to meet specific installation specifications and requirements where advantageous, e.g., installation of rubber radial tiles, hardwood (laminated) plank or parquet and ceramic tiles.

While the aqueous dispersion formulae are freeze/thaw sensitive, compatible freeze point depressive materials may be incorporated where below freezing temperatures are likely to be encountered. One material that has been used successfully to prevent freezing and to extend and lower the curing temperature is urea, also a chemically compatible, water soluble and environmentally benign material.

The adhesive material of the invention has been found to provide complete resistance to alkali or caustic materials through at least pH 11.0. A further attribute is the moisture resistance of the material. This applies both to subsurface moisture and moisture associated with flooding, cleaning processes or spillage. Present subsurface moisture resistant materials are limited to resisting a maximum of about 3.0 pounds per 1000 square feet per 24 hours (as determined by the Rubber Manufacturers Association Calcium Chloride Test Method). The adhesive preparation of the present invention used as a flooring primer or sealcoating layer on concrete, wood or other porous or semi-porous material has been observed to prevent subsurface moisture penetration or emission where the emission potential is as high as 5.5–6.0 pounds water per 1000 square feet per 24 hours.

When the material is used as a sealcoating, one layer is applied to the bare floor and allowed to cure. Thereafter, a second application is used as the bonding material to bond the floor covering to the subfloor.

We claim:

1. A one-step water-based liquid adhesive composition comprising an amount of an aqueous latex dispersion of a polymer latex base material selected from polymers of the monomer group consisting of acrylics, styrene-butadiene, carboxylated styrene-butadiene, nitriles neoprenes, ethylene and vinyl acetates with an amount of a rosin acid ester hardener and an amount of a thickener in sufficient water to adjust the percent solids to a predetermined amount, said composition being free of organic solvents and the adhesive bonding properties thereof being fully activated.

2. The adhesive composition of claim 1 wherein said base material comprises a pressure sensitive acrylic polymer.

3. The adhesive composition of claim 2 further comprising an amount of one or more preformed polyurethane synthetic polymer latex resin modifiers selected from the group consisting of waterborne polyether-polyurethane and polyester-polyurethane synthetic polymer latex resins.

4. The adhesive composition of claim 1 further comprising an amount of one or more preformed polyurethane synthetic polymer latex resin modifiers selected from the group consisting of waterborne polyether-polyurethane and polyester-polyurethane synthetic polymer latex resins.

5. The adhesive composition of claim 3 further comprising an amount of polyisocyanate, aziridine or carbodiimide cross-linker.

6. The adhesive composition of claim 4 further comprising an amount of polyisocyanate, aziridine or carbodiimide cross-linker.

7. The adhesive composition of claim 1 further comprising an amount of inert filler and an amount of a plasticizer/extender.

8. The adhesive composition of claim 3 further comprising an amount of inert filler and an amount of a plasticizer/extender.

9. The adhesive composition of claim 7 wherein the inert filler additives are selected from the group consisting of Kaolins, calcium carbonates, barium sulfates, silicate spheres, ground reprocessed rubber, cellulose, and reclaimed synthetic fiber reclaimed.

10. The adhesive composition of claim 7 wherein the plasticizer/extender modifiers are selected from the group consisting of paraffinics, napthenics and phthalates.

11. A water-based, one-step floor covering adhesive composition said composition being free of organic solvents and having activated adhesive bonding properties comprising the following approximate combination by weight:

| | |
|---|---|
| Polymer Latex Base Materials selected from the group consisting of polymers of Acrylics, Styrene-butadiene, Carboxylated Styrene-butadiene, Nitriles, Neoprenes, Ethylene and Vinyl Acetates | 50–100 parts |
| Polyether or Polyester Polyurethane Latex Modifiers | 0–80 parts |
| Inert Filler Additives selected from the group consisting of Kaolins, Calcium Carbonates, Barium Sulfates, Silicate spheres, Ground reprocessed rubber, Cellulose and reclaimed synthetic fiber | 0–160 parts |
| Plasticizer/Extender Modifiers selected from the group consisting of paraffinics, napthenics and phthalates | 0–15 parts |
| Rosin Acid Ester | 25–70 parts |
| Polyacrylate thickener | 1–5 parts |
| Water sufficient to adjust solids to desired consistency | 0–2 parts |
| Aliphatic Polyisocyanate Cross-linker. | |

12. The adhesive composition of claim 11 wherein the percent solids is in the range from about 50 to about 70 percent.

* * * * *